US006138408A

United States Patent [19]

Paternoster et al.

[11] Patent Number: 6,138,408

[45] Date of Patent: Oct. 31, 2000

[54] TUBE DELIVERY SYSTEM AND METHOD

[75] Inventors: Joseph Paternoster; Harold Jensen, both of Santa Rosa, Calif.

[73] Assignee: Driwater, Inc., Santa Rosa, Calif.

[21] Appl. No.: 09/096,834

[22] Filed: Jun. 12, 1998

[51] Int. Cl.[7] .................... A01G 29/00

[52] U.S. Cl. .................... 47/48.5

[58] Field of Search .................... 47/48.5, 58.1, 47/79, 80, 1.01 R; 43/131

[56] References Cited

U.S. PATENT DOCUMENTS

| | | | |
|---|---|---|---|
| 2,791,347 | 5/1957 | Boehm | 257/121 |
| 2,931,140 | 4/1960 | Laffler et al. | 47/48.5 |
| 3,287,222 | 11/1966 | Larde et al. | 167/84 |
| 3,337,326 | 8/1967 | Nadler et al. | 71/26 |
| 4,051,628 | 10/1977 | Knapp et al. | 47/48.5 |
| 4,089,133 | 5/1978 | Duncan | 47/48.5 |
| 4,090,022 | 5/1978 | Tsao et al. | 536/57 |
| 4,102,842 | 7/1978 | Fujimoto et al. | 260/29.6 |
| 4,453,343 | 6/1984 | Grimes, Sr. | 47/48.5 |
| 4,745,706 | 5/1988 | Muza et al. | 47/47 |
| 4,865,640 | 9/1989 | Avera | 71/23 |
| 5,918,412 | 7/1999 | Shen | 47/48.5 |
| 5,924,240 | 7/1999 | Harrison | 47/48.5 |

FOREIGN PATENT DOCUMENTS

| | | | |
|---|---|---|---|
| 0 620 204 A1 | 10/1994 | European Pat. Off. | C05G 3/00 |
| WO 92/00941 | 1/1992 | WIPO | C05D 5/00 |

OTHER PUBLICATIONS

DriWater™ Product Information.

"A New Kind of Drip Irrigation" *Land and Water,* pp. 48–49, Jan./Feb. 1998.

*Primary Examiner*—Michael J. Carone
*Assistant Examiner*—Jeffrey L. Gellner
*Attorney, Agent, or Firm*—Dergosits & Noah LLP

[57] ABSTRACT

A system and method are provided for controllably delivering water from a moisturizing agent to plant tissue. The angled insertion end of a delivery tube is placed in the soil in close proximity to the root system of a plant. An insert containing moisturizing agent is opened at an end to expose the moisturizing agent and then placed through the receiving end of the delivery tube and into the hollow bore thereof. A cap is then removably placed over the receiving end to seal the insert within the hollow bore of the delivery tube, thereby reducing loss of moisture to evaporation and preventing foreign matter or insects from migrating into the tube. An exhausted insert is replaced by removing the cap, withdrawing the empty insert, and placing a new insert within the hollow bore of the delivery tube. Alternatively, moisturizing agent can be directly injected into the delivery tube, for example, from a tank or canister. The size of the insert and the moisturizing agent surface area that is exposed to the soil determine the amount of water provided to a plant, and the length of time over which this water is provided. A small amount of food grade preservative can be added to the moisturizing agent to further control the liquefaction rate by retarding bacterial action.

12 Claims, 4 Drawing Sheets

TUBE DELIVERY SYSTEM AND METHOD

BACKGROUND OF THE INVENTION

1. Field of the Invention

The present invention relates to the distribution of a moisturizing substrate to plant tissue. More specifically, the present invention relates to a system and method for controllably delivering water to a plant.

2. Description of Related Art

The problem of maintaining a soil moisture content sufficient to sustain a growing plant has long been recognized. The most common method of adding water to soil is by watering using manual or automatic means, such as sprinkler or drip irrigation systems. However, manual watering is extremely time and labor-intensive. In addition, automatic watering systems can be expensive to install and operate.

Moisturizing agents have been used to solve the problems inherent to manual and automatic watering systems. A moisturizing agent releases moisture into its immediate vicinity. One such moisturizing agent is described in Avera, Moisturizing Agent, U.S. Pat. No. 4,865,640. The Avera moisturizing agent is a gel-like product that appears dry to the touch and semi-solid in appearance. This moisturizing agent can contain approximately 98% of water bound in solid form.

The solid bound water is gradually converted to liquid water when placed in the microbial environment of natural soils. The bacteria and other microorganisms that liquefy this bound water do not migrate into the gel but act on its exposed surface. The liquefaction rate of moisturizing agents such as that taught by Avera can therefore be controlled by controlling the amount of moisturizing agent surface area that is exposed to the soil.

FIG. 1 is a side view of a delivery system for a moisturizing agent according to the prior art. The moisturizing agent 12 is disposed within a carton 10. The bottom 20 of the carton is removed to expose the moisturizing agent. The carton can then be inserted into a hole 22 in the soil 16. The moisturizing agent exposed to the soil through the bottom of the carton is liquefied by microbial action to provide water to the root system 18 of a plant 14. As the exposed portion of the moisturizing agent is liquefied, the next layer of bound-water gel becomes exposed to the microorganisms and drips out of the bottom of the carton. When the moisturizing agent has been completely liquefied, the empty carton is removed from the soil.

Several known problems are associated with this distribution system. The carton is unsightly, and therefore is not suitable for use with decorative plants. It is not possible to determine whether the moisturizing agent within the carton has been completely liquefied without removing the carton. Furthermore, the carton must be removed and a new carton inserted to provide a new supply of moisturizing agent. Soil can then filter into the hole made by the removed carton. It can therefore be time consuming and difficult to insert another carton into the hole.

A "cup" (not shown) that contains a moisturizing agent has also been used to distribute controlled amounts of water to a plant. The cup is uncovered and placed upside-down on the soil surface to expose the moisturizing agent contained in the cup to microbial action. The cup, however, is unsightly. In addition, this distribution system is not practical for use outdoors because the cup is easily tipped over or moved by wind, rain, or hail. Furthermore, insect colonies can develop in the moist shaded area underneath the cup.

It would therefore be an advantage to provide a method and system for distributing moisture to a plant. It would be a further advantage if the system facilitated replacement of consumed moisturizing agent. It would be yet another advantage if the system were sufficiently attractive to be used with decorative plants and flower arrangements.

SUMMARY OF THE INVENTION

The present invention is a system and method for controllably delivering water from a moisturizing agent to plant tissue, including both growing plants and cut plant displays (such as flower arrangements). In the present invention, the angled insertion end of a delivery tube is placed in the soil in close proximity to the root system of a plant. An insert containing moisturizing agent is opened at an end to expose the moisturizing agent and is then placed through the receiving end of the delivery tube and into the hollow bore thereof. A cap is then removably placed over the receiving end to seal the insert within the hollow bore of the delivery tube, thereby reducing loss of moisture to evaporation and preventing foreign matter or insects from migrating into the tube. An exhausted insert is easily replaced by removing the cap, withdrawing the empty insert, and placing a new insert within the hollow bore of the delivery tube.

The insert is preferably made of thin plastic that encloses moisturizing agent in a sausage-shaped chub. However, the delivery tube is readily configured to receive any suitable shape of insert. Alternatively, moisturizing agent can be directly injected into the delivery tube, for example, from a tank or canister.

The amount of water provided to a plant, and the length of time over which this water is provided, are determined by the size of the insert and by the moisturizing agent surface area that is exposed to the soil. The liquefaction rate can be further controlled by adding a small amount of food grade preservative to the moisturizing agent to retard the bacterial action.

DETAILED DESCRIPTION OF THE INVENTION

The present invention is a system and method for controllably delivering water from a moisturizing agent to plant tissue. The tube delivery system according to the present invention can be used to provide controlled amounts and rates of water distribution to both growing plants and cut plant displays (such as flower arrangements). The preferred embodiment of the present invention is adapted for distributing the moisturizing agent described in Avera, U.S. Pat. No. 4,865,640, discussed previously. However, the teachings of the invention can equally be applied to distribution of any other appropriate moisturizing agent.

Figure 1:
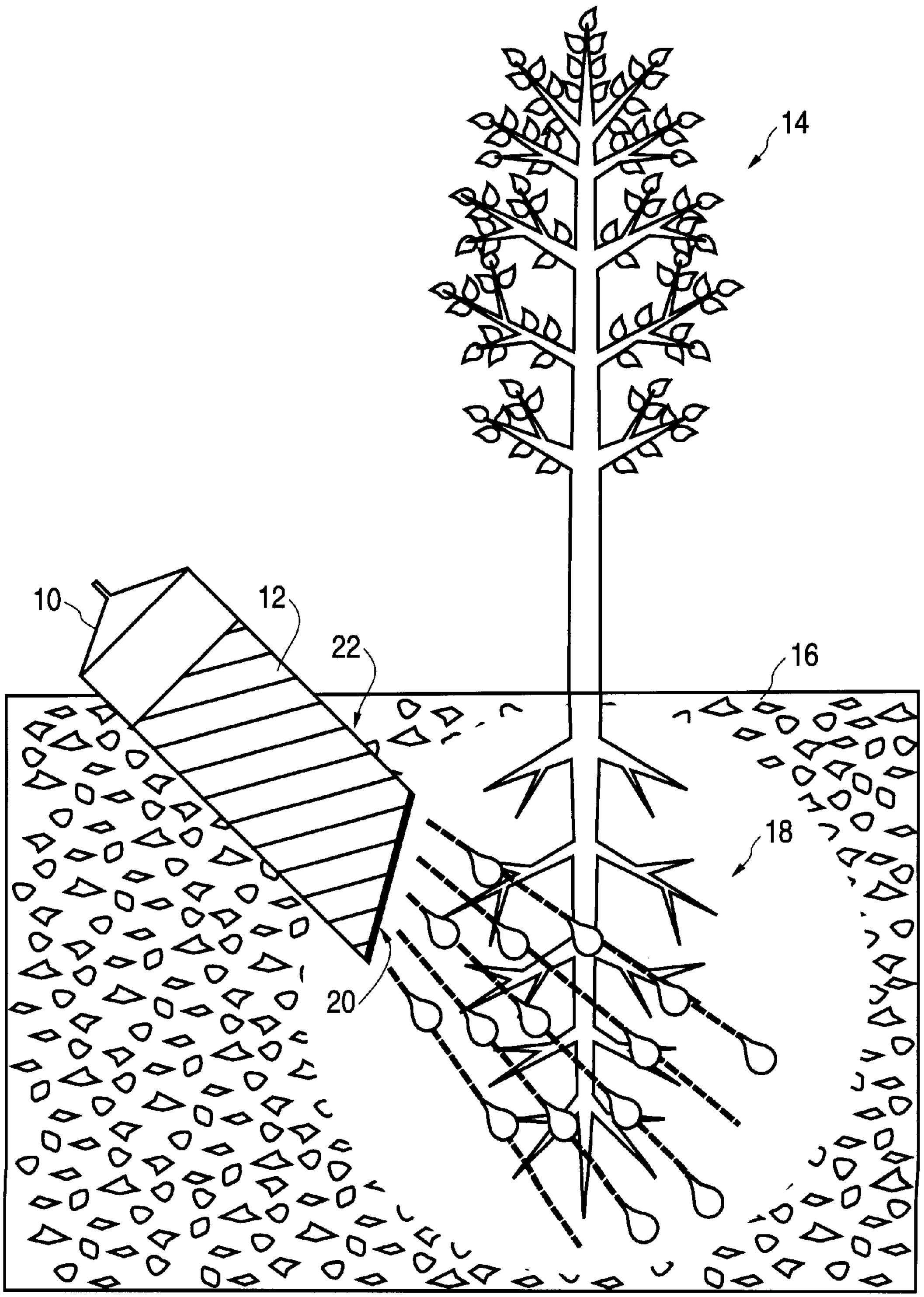
FIG. 1 is a side view of a delivery system for a moisturizing agent according to the prior art.
Figure 2:
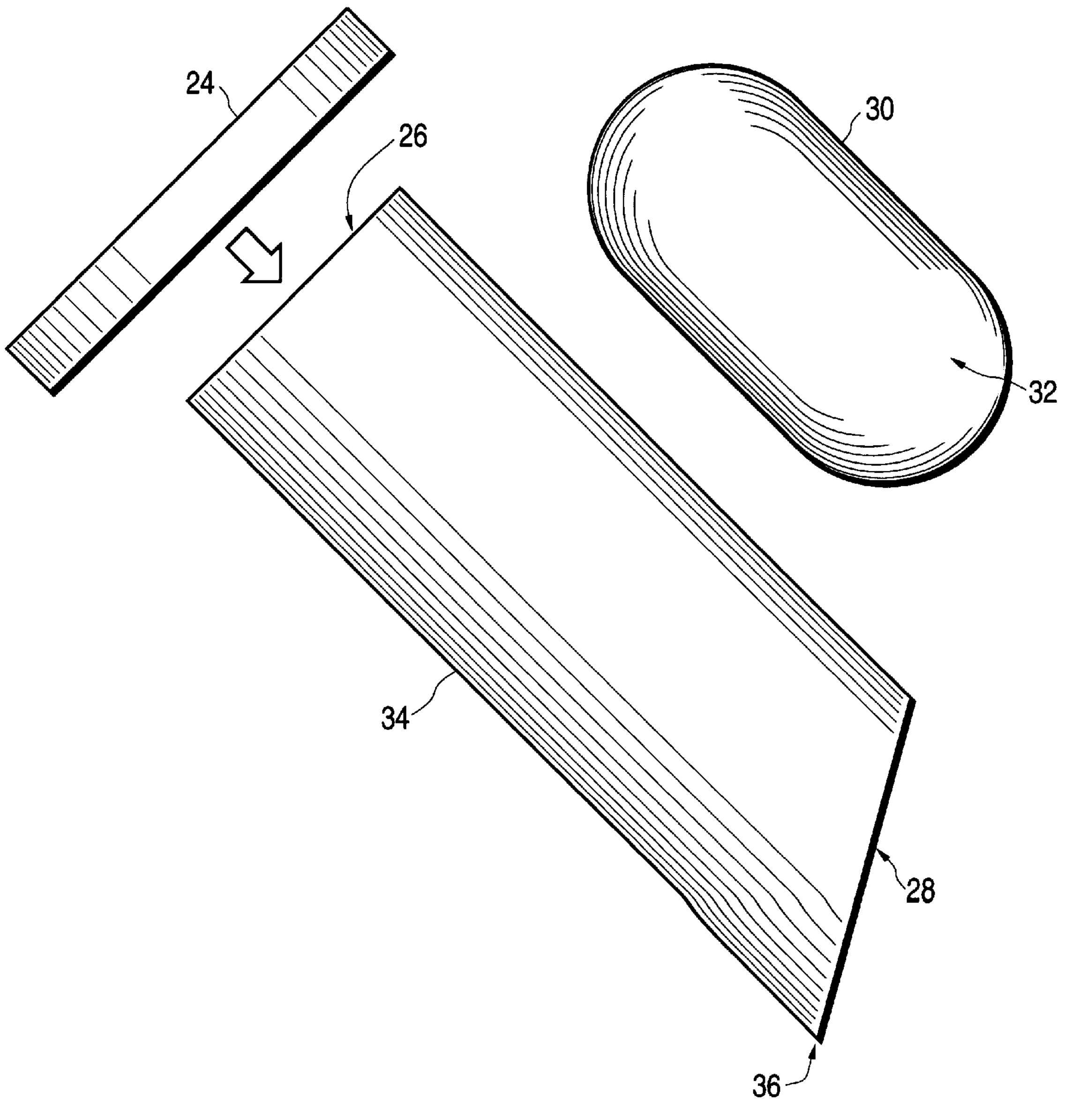
FIG. 2 is a side view of a delivery tube according to the present invention.

FIG. 2 is a side view of a delivery tube according to the present invention. In the preferred embodiment of the present invention, the delivery tube 34 is a hollow length of rigid tubing made, for example, of a non-corrosive material such as plastic, ceramic, or glass. However, the delivery tube can also be formed of any suitable material or combination of materials that has sufficient rigidity to support the moisturizing agent insert 30. Such materials include but are not limited to metals, wood, rubber, and natural or artificial fibers. The delivery tube can be formed by such methods as blow molding, injection molding, or extrusion.

The insertion end 28 of the delivery tube is angled to a point 36 to facilitate insertion of the tube into the soil. The insertion end of the delivery tube is placed in the soil in close proximity to the root system of a plant (not shown). In the preferred embodiment of the invention, the delivery tube is inserted deeply into the soil such that, at most, only a small portion of the length of the delivery tube protrudes therefrom. However, in alternative embodiments, any portion of the length of the delivery tube can protrude from the soil, depending upon factors including but not limited to the total length of the delivery tube, the depth of the plant root system, and the volume of moisturizing agent to be distributed.

The insert 30 containing the moisturizing agent 32 is opened at an end (not shown) to expose the moisturizing agent and is then placed through the receiving end 26 and into the hollow bore (not shown) of the delivery tube. The angled cut of the delivery tube increases the surface area of moisturizing agent that is exposed to the microbial action of the soil.

A cap 24 is then removably placed over the receiving end to seal the insert within the hollow bore of the delivery tube. An exhausted insert is easily replaced by removing the cap, withdrawing the empty insert, and placing a new insert within the hollow bore of the delivery tube. There is no need to remove the delivery tube from the soil to replace the inserted moisturizing agent.

In the preferred embodiment of the present invention, the insert is made of thin plastic tubing that encloses the moisturizing agent. This thin tubing can be provided in a variety of lengths and diameters for specific applications. Because the liquefaction rate of the moisturizing agent is controlled by the amount of moisturizing agent exposed to the soil, the amount of water provided to a plant and the length of time over which this water is provided is dependent upon the size and diameter of the insert.

The hollow bore of the delivery tube is configured to receive an insert having a particular length or diameter. In the presently preferred embodiment, the insert is shaped as a chub, resembling a sausage. An exemplary embodiment of the presently preferred embodiment of the invention is a delivery tube having a length of approximately 7 inches and a diameter of approximately 2 inches, with a chub dimensioned to be received therein. The insert can also be formed of other suitable materials or combinations of materials including but not limited to paper, metal, metal foil, and rubber.

In alternative embodiments of the present invention, the insert and delivery tube can have any suitable shapes and dimensions. For example, the delivery tube can be configured to receive a carton-shaped insert. Thus, the present invention can be used with a prior art carton. The delivery tube presents the carton attractively. Furthermore, using the tube delivery system according to the present invention, the carton can be easily removed and inspected to determine if its contents have been completely liquefied. A new carton can then be inserted into the hollow bore with minimal effort. A delivery tube can also be configured to receive the delivery cup known in the prior art.

In yet another embodiment of the present invention, moisturizing agent is directly injected into the delivery tube. For example, the delivery tube can be manually or automatically refilled with moisturizing agent that is stored in a tank. This embodiment is used to advantage for outdoor applications, such as reforestation and agriculture. In such applications, water is required on a continual basis. Delivery tubes according to the present invention can be placed in the soil at the time of planting or thereafter. The delivery tubes can then be filled and refilled by directly injecting moisturizing agent from a storage tank into the hollow bores. In areas that are not readily accessible to fixed or mobile storage tanks, inserts containing moisturizing agent can be used to controllably provide water to the plants.

Figure 3:
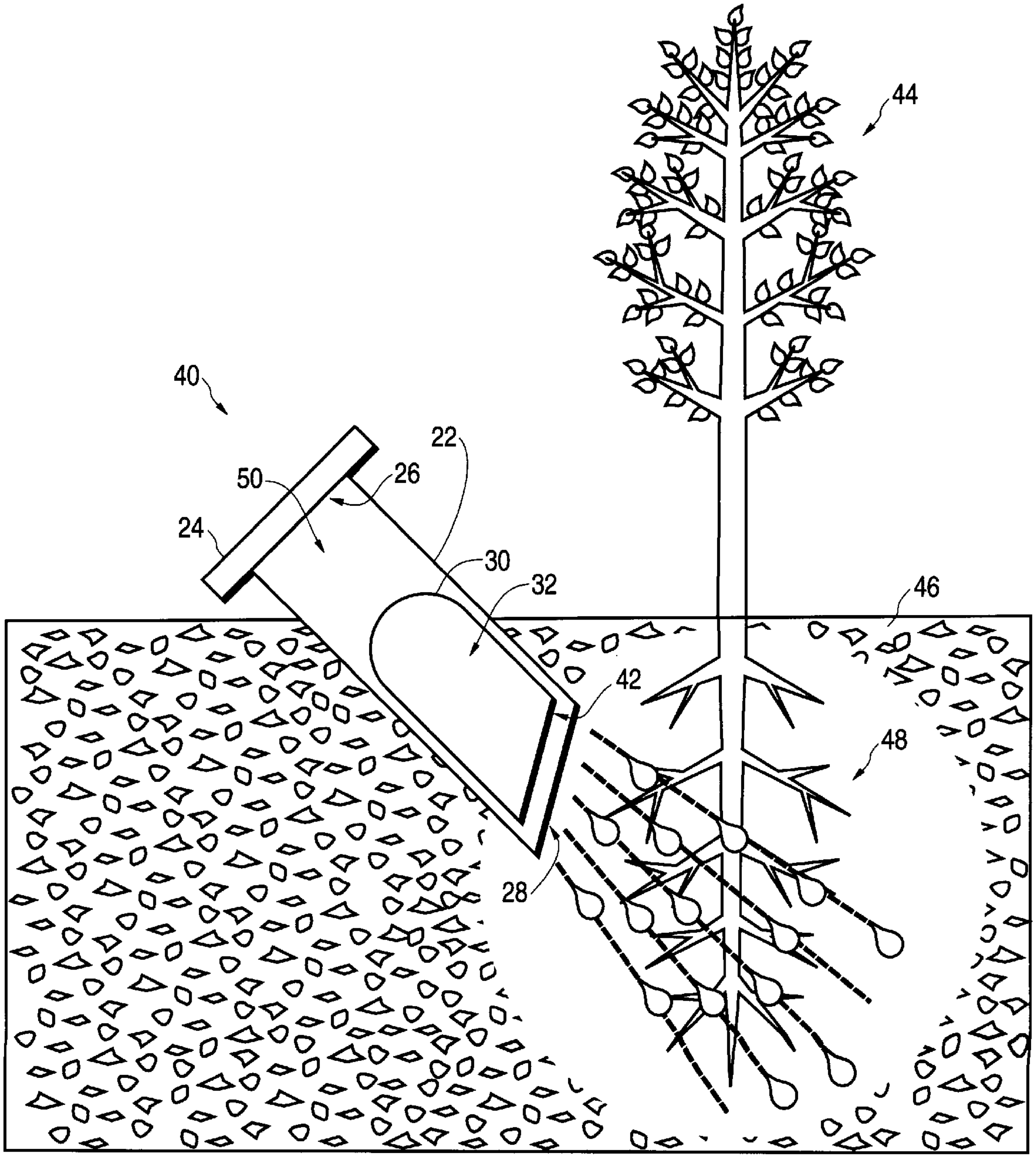
FIG. 3 is a side sectional view of a tube delivery system according to the present invention.

FIG. 3 is a side sectional view of a tube delivery system 40 according to the present invention. The delivery tube 22 is placed into the soil 46 with the insertion end 28 in close proximity to the root system 48 of a plant 44. An insert 30 containing moisturizing agent 32 is inserted into the hollow bore 50 of the delivery tube, with the opened end 42 of the insert exposed to the microbial activity in the soil. The cap 24 is then placed on the receiving end 26 to seal the insert within the hollow bore of the delivery tube. In this preferred embodiment, the cap reduces loss of moisture to evaporation and prevents foreign matter or insects from migrating into the tube.

Figure 4:
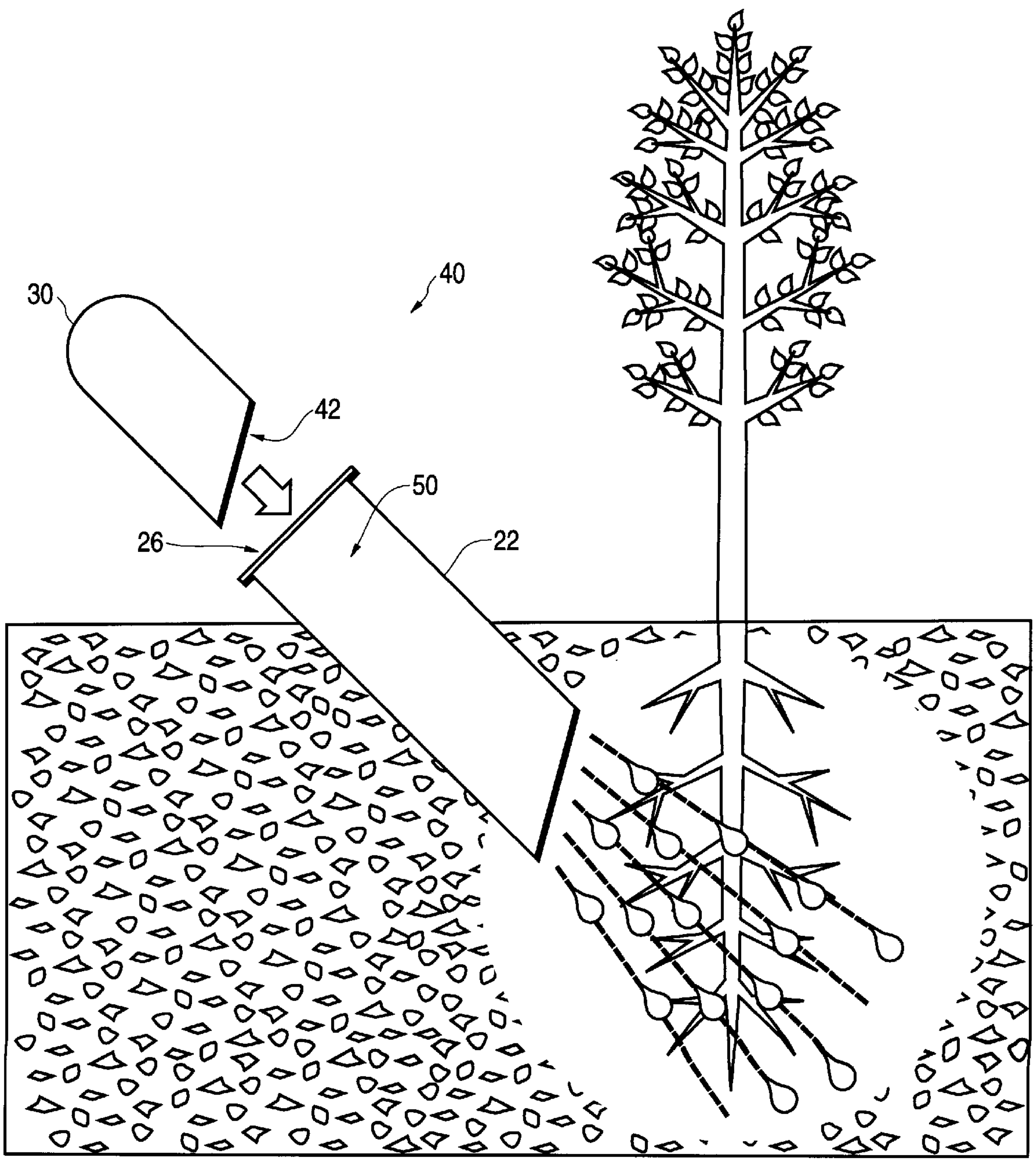
FIG. 4 is a side sectional view of insert placement in a tube delivery system according to the present invention.

FIG. 4 is a side sectional view of insert placement in a tube delivery system 40 according to the present invention. In the Figure, an end 42 of the chub-shaped insert is opened or cut to expose the moisturizing agent. The insert 30 is then inserted, cut end 42 first, into the hollow bore 50 of the delivery tube 22, to expose the moisturizing agent to the microbial activity in the soil. The cap (not shown) can then be placed on the receiving end 26 to seal the insert within the hollow bore of the delivery tube.

While the invention is described in conjunction with the preferred embodiments, this description is not intended in any way as a limitation to the scope of the invention. Modifications, changes, and variations which are apparent to those skilled in the art can be made in the arrangement, operation and details of construction of the invention disclosed herein without departing from the spirit and scope of the invention.

For example, the rate of liquefaction of the moisturizing agent can be further controlled by adding a small amount of food grade preservative to the moisturizing agent. This preservative can retard the bacterial action and extend the liquefaction period. An example of a preferred preservative is sodium benzoate in the amount of 0.005% to 0.05% of the volume of water by weight.

The delivery tube or cap can be decorated or colored to enhance its appearance for use with decorative plants or flower displays. Additionally, the delivery tube or cap can be shaped to be less visible, for example, by being configured or colored to resemble natural items such as stems, tree stumps, or rock formations. For example, in the preferred embodiment of the present invention, the delivery tube and cap are colored brown to blend in with the soil coloring. However, in alternative embodiments, the delivery tube and cap can have any desired color or colors.

It is also possible to use the delivery tube without a cap. Such capless tube could be either directly filled with the moisturizing agent or could be adapted to receive an insert containing moisturizing agent.

What is claimed is:

1. A delivery system for distributing water to plant tissue, comprising:

a delivery tube having a receiving end and an insertion end, the delivery tube further having a hollow bore formed therethrough from the receiving end to the insertion end;

a cap configured to removably seal the receiving end of the delivery tube; and a gelatinous moisturizing agent that is contained in an insert, the insert being dimensioned for insertion into the hollow bore;

wherein the delivery tube is adapted for placement in soil such that the insertion end is in close proximity to the root system of a plant;

wherein the hollow bore is adapted to receive the gelatinous moisturizing agent through the receiving end such that the exposed gelatinous moisturizing agent is brought into contact with the soil through a cross-section of the insertion end to distribute water from the moisturizing agent;

wherein the gelatinous moisturizing agent gradually releases impregnated water at a predetermined rate when interacting with a biological organism in the soil.

2. The delivery system of claim 1, wherein the insert is formed of a material selected from the group consisting of thin plastic tubing, paper, metal, metal foil, and rubber.

3. The delivery system of claim 1, wherein the insert is substantially cylindrically-shaped.

4. A method for distributing water to plant tissue, comprising the steps of:

placing an insertion end of a delivery tube in soil in close proximity to the root system of a plant, the delivery tube having a hollow bore formed therethrough from the insertion end to a receiving end;

enclosing a gelatinous moisturizing agent in an insert;

opening an end of the insert to expose the gelatinous moisturizing agent;

placing the insert through the receiving end and into the hollow bore of the delivery tube such that the exposed gelatinous moisturizing agent at the open end is brought into contact with the soil through a cross-section of the insertion end of the delivery tube to gradually release impregnated water at a predetermined rate when interacting with a biological organism in the soil; and removably sealing the receiving end of the delivery tube with a cap.

5. The method of claim 4, further comprising the steps of:

removing the cap from the receiving end of the delivery tube;

removing an exhausted insert contained within the hollow bore of the delivery tube;

placing another insert within the hollow bore of the delivery tube; and replacing the cap on the receiving end of the delivery tube.

6. A delivery system for distributing water to plant tissue, comprising:

a delivery tube having a receiving end and an insertion end, the delivery tube further having a hollow bore formed therethrough from the receiving end to the insertion end; and a gelatinous moisturizing agent disposed within the hollow bore; wherein the gelatinous moisturizing agent is contained in an insert, the insert being dimensioned for insertion into the hollow bore;

wherein the delivery tube is adapted for placement in soil such that the insertion end is in close proximity to the root system of a plant;

wherein the delivery tube is adapted to receive the gelatinous moisturizing agent through the receiving end and to gradually distribute at a predetermined rate impregnated water released from an exposed cross-section of the gelatinous moisturizing agent through the insertion end when the gelatinous moisturizing agent interacts with a biological organism in the soil.

7. A delivery system for distributing water to plant tissue, comprising:

a delivery tube having a receiving end and an insertion end, the delivery tube further having a hollow bore formed therethrough from the receiving end to the insertion end;

a cap configured to removably seal the receiving end of the delivery tube; and a gelatinous moisturizing agent that is contained in an insert formed of a material selected from the group consisting of thin plastic tubing, paper, metal, metal foil, and rubber;

wherein the delivery tube is adapted for placement in soil such that the insertion end is in close proximity to the root system of a plant;

wherein the hollow bore is adapted to receive through the receiving end the gelatinous moisturizing agent such that the exposed gelatinous moisturizing agent is brought into contact with the soil through the insertion end to distribute water from the moisturizing agent.

8. The delivery system of claim 7, wherein the hollow bore is adapted to receive moisturizing agent contained in an insert that is substantially cylindrically-shaped.

9. A method for distributing water to plant tissue, comprising the steps of:

placing an insertion end of a delivery tube in soil in close proximity to the root system of a plant, the delivery tube having a hollow bore formed therethrough from the insertion end to a receiving end;

enclosing a gelatinous moisturizing agent in an insert;

opening an end of the insert to expose the gelatinous moisturizing agent;

placing the insert through the receiving end and into the hollow bore of the delivery tube such that the exposed gelatinous moisturizing agent at the open end is brought into contact with the soil through the insertion end of the delivery tube; and removably sealing the receiving end of the delivery tube with a cap.

10. The method of claim 9, further comprising the steps of:

removing the cap from the receiving end of the delivery tube;

removing an exhausted insert contained within the hollow bore of the delivery tube;

placing another insert within the hollow bore of the delivery tube; and replacing the cap on the receiving end of the delivery tube.

11. A method for distributing water to plant tissue, comprising the steps of:

placing an insertion end of a delivery tube in soil in close proximity to the root system of a plant, the delivery tube having a hollow bore formed therethrough from the insertion end to a receiving end; and inserting a gelatinous moisturizing agent into the hollow bore of the delivery tube;

wherein the step of inserting a gelatinous moisturizing agent further comprises the steps of:

enclosing the gelatinous moisturizing agent in an insert, opening an end of the insert to expose the gelatinous moisturizing agent, and placing the insert through the receiving end and into the hollow bore of the delivery tube such that the exposed gelatinous moisturizing agent at the open end is brought into contact with the soil through the insertion end of the delivery tube;

wherein the gelatinous moisturizing agent gradually releases impregnated water at a predetermined rate when interacting with a biological organism in the soil.

12. The method of claim 11, further comprising the steps of:

removing an exhausted insert contained within the hollow bore of the delivery tube; and placing another insert within the hollow bore of the delivery tube.

* * * * *